July 29, 1947.   W. G. GRIMES   2,424,688
QUICK DETACHABLE LANDING LIGHT FOR AIRPLANES
Filed Dec. 4, 1944   2 Sheets-Sheet 1
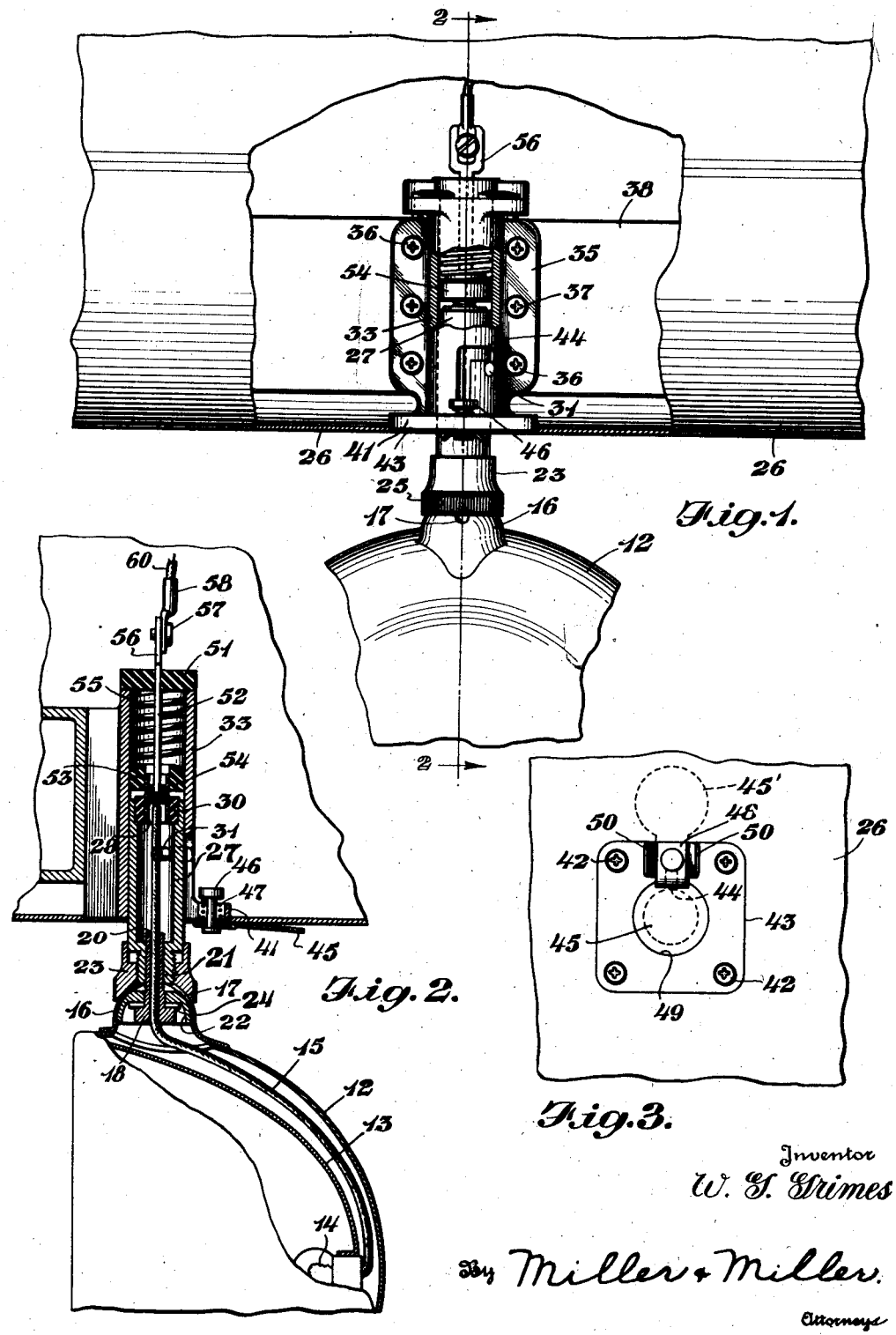

July 29, 1947.  W. G. GRIMES  2,424,688

QUICK DETACHABLE LANDING LIGHT FOR AIRPLANES

Filed Dec. 4, 1944  2 Sheets—Sheet 2

Inventor
W. G. Grimes
By Miller + Miller
Attorneys

Patented July 29, 1947

2,424,688

UNITED STATES PATENT OFFICE 2,424,688

QUICK DETACHABLE LANDING LIGHT FOR AIRPLANES

Warren G. Grimes, Urbana, Ohio

Application December 4, 1944, Serial No. 566,421

6 Claims. (Cl. 240—7.7)

This invention relates to a quick detachable landing light for airplanes and has for an object to provide light weight detachable landing light especially adapted for small and light weight aircraft.

A further object of this invention is to provide detachable landing light for airplanes which can be attached to or detached from the airplane in a matter of seconds without the aid of any tools whatsoever, and which is attached both mechanically and electrically by the same operation, ready for immediate use.

A further object of this invention is to provide a landing light fixture which can be built into any airplane, or can be added to practically any existing airplane by any airplane mechanic, which fixture is of such extremely light weight that a pair of them add less than a pound to the weight of the airplane, which fixture, once in position, enables the landing light itself to be attached or detached in a few seconds, without the use of any tools whatsoever.

A further object of this invention is to provide a landing light fixture which may be permanently attached within the wing surface of an airplane without changing its flying characteristics whatsoever.

Yet a further object of this invention is to provide combination lamp and lamp fixture wherein the lamp may be easily and quickly attached to and detached from the fixture without the use of any tools whatsoever, and wherein the angle of the lamp relative to the fixture may be easily adjusted, without tools, relative to the fixture, and wherein the set angle will remain fixed indefinitely unless deliberately changed.

A further object of this invention is to provide a pair of lamps and lamp fixtures wherein a very simple detail will make a right and a left lamp, so that, when each lamp has been adjusted to its desired angle, it will not be easily mixed with the other next time it is attached in position.

Still a further object of this invention is to provide a lamp fixture that can be attached within a wing surface to an internal strut or brace irrespective of the angle of the supporting strut or brace, and wherein the lamp may be adjusted to a proper desired angle relative to the line of flight irrespective of the angle of the supporting strut or brace.

A further object of this invention is to provide a lamp fixture which may be made of either a conducting material, such as metal, or a non-conducting material, such as a plastic, wood or phenolic condensation product and may serve as a grounding connection to the plane, whether the wing strut or brace be a conductor or non-conductor.

Still a further object of this invention is to provide a combination lamp and lamp fixture which, while particularly adapted for and intended for use in connection with small aircraft, is also serviceable on any size of aircraft, either as a landing light or as a light for any other purpose, any may likewise be serviceable for use on other types of vehicles, or even non-vehicles, including buildings. However, its particular advantage of light weight and quick attachability are most important in small aircraft, and may not be so important in other uses.

Still a further object is to provide landing light for aircraft wherein the lamp may be removed from the lamp fixture for use during daylight flight and be carried within the fuselage or left at the hangar, thus avoiding its parasitic drag when it is not needed for landing purposes, and which may be inserted into the fixture whenever a night takeoff or landing is contemplated.

Other objects and advantages of the invention will become apparent during the course of the following description when taken in connection with the accompanying drawing.

Fig. 1 is partly sectional and partly elevational view showing the lamp and fixture attached to a wing surface.

Fig. 2 is a sectional view on line 2—2 of Fig. 1.

Fig. 3 is a fragmentary bottom view of a wing surface having the lamp fixture attached therein.

Fig. 4 is a perspective view of the lamp fixture or receptacle.

Fig. 5 is a similar perspective view of the lamp stem.

Fig. 6 is a view similar to Fig. 1 showing the other member of the pair.

Fig. 7 is a sectional view wherein the fixture is principally of non-conducting material, and Fig. 8 is a perspective view of bottom wing surface with the lamp in position.

There is shown at 10 the lamp fixture, at 11 the lamp stem and at 12 the lamp canopy wherein is mounted the lamp 13 having the lamp filament 14.

The lamp 13 may be any suitable type of lamp, sealed beam or otherwise, having the proper candlepower for the purpose intended, with the filament 14 usually prefocused with relation thereto. This lamp 13 is suitably supported, preferably with a cushioning type of mounting, within the canopy 12, a single conduit wire 15 being provided between the canopy 12 and lamp 13 for suitable connection to the filament 14.

The canopy 12 is provided with a hemispherical bulge 16 at its top, the bulge 16 being provided with a radial slot 17 as shown. Through this slot 17 is passed a stud screw 18 having a hollow shank 20 permitting the conduit wire 15 to extend therethrough as shown. The screw 18 is threaded into the internally threaded neck 21 of the lamp stem 11, and serves to secure a semi-sphere 22 adapted to cooperate with a socket 23 adjustably threaded externally on the stem neck 21. A lock washer 24 is placed between the screw 18 and the semi-sphere 22, the semi-sphere 22 forming the ball of the ball-and-socket joint for adjustably securing the canopy 12 to the lamp stem 11. The socket 23 is knurled as at 25 to provide easy manipulation thereof in adjusting the angle of the canopy 12 relative to the lamp stem 11 when the lamp 13 is mounted in position on the wing 26 with the canopy bulge 16 between the semi-sphere 22 and the socket 23.

The lamp stem 11 consists of a metallic cylinder 27 having the internally and externally threaded neck 21 at one end and a hollow contact member 28 supported at its other end by an insulating grommet 30, while intermediate the ends thereof there is provided a bayonet pin 31 extending out through one side thereof. The stranded ends of conduit wire 15 are passed through the hollow contact 28 and are electrically and mechanically secured thereto by a drop of solder.

The lamp fixture or receptacle 10 consists of a housing 32 including an internally cylindrical portion 33 of a diameter to receive the lamp stem cylinder 27. The housing cylindrical portion 33 is provided with a pair of extending wings 34, each having an out-turned flange 35 having a plurality of apertures 36 through which may be passed attaching screws 37 for securing the fixture or receptacle 10 to a wing strut or brace 38.

The wing surface end of the housing 32 is provided with flanges 40 and 41 having threaded apertures for screws 42 for attaching a closure plate 43 thereto. Extending into the housing cylindrical portion 33 is a J-slot 44 for the reception of the lamp stem bayonet pin 31, the right and left fixtures being simply distinguished from each other by having the J-slots turned in opposite directions, as apparent from Figs. 1 and 6. The closure plate 43 is provided with an aperture 49 sufficiently large to enable the bayonet pin 31 to pass therethrough, and an aperture closing door 45 is attached to a tab 48 through which passes a pivot pin 46 having a coil spring 47 enabling the door 45 to be moved axially in and out of plate aperture 49 before or after it is turned to the out of way position 45' when the lamp stem 11 is mounted in the receptacle 10. The tab 48 is provided with angular finger grips 50 enabling the door 45 to be opened or closed as needed.

The other end of the internal cylindrical portion 33 is closed by an insulating bridge 51 through which extends a conducting tongue 52 terminating within the cylindrical portion 33 in a contact 53 secured within a cylindrical insulating grommet 54. A strong coil spring 55 between grommet 54 and bridge 51 keeps the tongue 52 within the cylindrical portion 33 to the limit permitted by the enlarged tongue finger 56 which cannot pass through the slit in the bridge 51. The tongue finger 56 is provided with a threaded aperture for a screw 57 for securing a wire terminal 58 thereto, the wire 60 being extended through the inside of the wing 26 to any suitable location within the fuselage 61 where it is provided with a suitable control switch. The return connection is grounded through the canopy 12 to the stem cylinder 27. If the wing strut or brace 38 is of conducting material and is grounded, the return will ground thereto through the housing securing screws 37, but if the strut 38 is of non-conducting material, then a grounding wire may be connected to any one of the screws 37.

If the housing 32' or its cylindrical portion 33' is of non-conducting material, then a grounding leaf spring 62 is secured thereto as by a screw 63 which may also secure a grounding wire 64, while the other end 65 of leaf spring 64 is extended through a suitable slot 66 in cylindrical portion 33' where it may make a sliding contact with the side of the inserted lamp stem cylinder 27.

In operation, the lamp fixture or receptacle 10 is permanently secured in each wing 26 to a suitable brace or strut 38, either when the plane is first constructed, or afterward, and the wire 60 is connected to a suitable switch in the fuselage 61. The first time the lamps 13 are attached, they are set at the proper angle on the right and left sides by adjusting the sockets 23. When the lamp 13 is removed by merely pressing inwardly a bit until the bayonet pin 31 is rotated and then withdrawn, the door 45 is then closed. The lamps 13 may then be left in the hangar, or carried in the airplane as convenient. When the lamps are properly adjusted, they should always be replaced in the same wings only. Should they be accidentally placed in the wrong wings, this fact will become apparent at once, due to the reversal of the J-slots in both wings, which would cause the improperly inserted lamps to point either toward or oppositely away from each other, instead of generally ahead of the airplane in the direction in which it is pointed.

With the construction thus described, it is apparent that no tools will be needed in removing or replacing the lamps, once the fixtures are permanently in position. Also, the lamps may be easily removed and replaced, thus making it convenient to remove them except when night flying, including night landing or night takeoff, is contemplated, thus avoiding the unnecessary parasitic drag of lamps during day flying.

While I have shown the preferred embodiment of my invention it is to be understood that minor changes may be made therein without departing from the spirit of the invention and the scope of the appended claims.

What I claim is:

1. A quick attachable detachable airplane light weight landing light comprising a lamp receptacle securable in a countersunk position in an airplane structural surface and a lamp member insertable into said receptacle, said lamp member including a lamp canopy in which a lamp is mounted and a lamp stem on which said lamp canopy is adjustably secured, said lamp stem including a hollow cylindrical member, a bayonet pin extending through at least one side thereof, an electrical contact insulatedly mounted at one end thereof, an internally and externally threaded neck projecting at the other end thereof, a hollow screw threaded into the neck, an apertured ball member held to the internal threads of said neck by said screw, a knurled manually manipulable apertured socket member on the external threads of said neck, said canopy having a slotted bulge within which said ball member is placed to cooperate with said socket member in adjustably securing said canopy on said stem by said screw, whereby said lamp may be adjusted to the desired angle, an electrical conductor secured to said stem contact and extending through said hollow stem and said hollow screw to the lamp within said lamp canopy, said receptacle including a cylindrical bore member to receive said lamp stem therewithin a bayonet J-slot in said cylindrical bore in cooperating relation with said stem bayonet pin, whereby to make a detachable bayonet connection an insulating bridge across the inner end of said cylindrical bore, a conducting tongue slidably extending through said insulating bridge, a contact on the end of said tongue within said bored member for electrical engagement with the lamp stem contact, an insulating grommet on said tongue contact, a strong coil spring between said insulating bridge and said insulating grommet urging said tongue outwardly of said bored member, a conductor receiving terminal on the other end of said tongue without said internally bored member limiting the inward movement of said tongue, and a closable door at the outer end of the bore member.

2. A quick attachable detachable airplane light weight landing light comprising a lamp receptacle securable in a countersunk position in an air plane structural surface and a lamp member insertable into said receptacle, said lamp member including a lamp canopy in which a lamp is mounted and a lamp stem on which said lamp canopy is adjustably secured, said lamp stem including a hollow cylindrical member, a bayonet pin extending through at least one side thereof, an electrical contact insulatedly mounted at one end thereof, an internally and externally threaded neck projecting at the other end thereof, a hollow screw threaded into the neck, an apertured ball member held to the internal threads of said neck by said screw, a knurled manually manipulable apertured socket member on the external threads of said neck, said canopy having a slotted bulge within which said ball member is placed to cooperate with said socket member in adjustably securing said canopy on said stem by said screw whereby said lamp may be adjusted to the desired angle, an electrical conductor secured to said stem contact and extending through said hollow stem and said hollow screw to the lamp within said lamp canopy, said receptacle including a cylindrical bore to receive said lamp stem therewithin, a bayonet J-slot in said cylindrical bore in cooperating relation with said stem bayonet pin, whereby to make a detachable bayonet connection, an insulating bridge across the inner end of said cylindrical bore, a conducting tongue slidably extending through said insulating bridge, a contact on the end of said tongue within said bore for electrical engagement with the lamp stem contact, an insulating grommet on said tongue contact, a strong coil spring between said insulating bridge and said insulating grommet urging said tongue outwardly of said bored cylindrical member, a conductor receiving terminal on the other end of said tongue without said internally bored member and limiting the inward movement of said tongue, a closable door at the outer end of the bore member; and mounting wings on said receptacle.

3. A quick attachable detachable airplane light weight landing light comprising a lamp receptacle securable in a countersunk position in an airplane structural surface and a lamp member insertable into said receptacle, said lamp member including a lamp canopy in which a lamp is mounted and a lamp stem on which said lamp canopy is adjustably secured, said lamp stem including a hollow cylindrical member, a bayonet pin extending through at least one side thereof, an electrical contact insulatedly mounted at one end thereof, an internally and externally threaded neck projecting at the other end thereof, a hollow screw threaded into the neck, an apertured ball member held to the internal threads of said neck by said screw, a knurled manually manipulable apertured socket member on the external threads of said neck, said canopy having a slotted bulge within which said ball member is placed to cooperate with said socket member in adjustably securing said canopy on said stem by said screw whereby said lamp may be adjusted to the desired angle, an electrical conductor secured to said stem contact and extending through said hollow stem and said hollow screw to the lamp within said lamp canopy, said receptacle including a slotted wall portion, and a cylindrical bore to receive said lamp stem therewithin, a bayonet J-slot in said cylindrical bore in cooperating relation with said stem bayonet pin, whereby to make a detachable bayonet connection, an insulating bridge across the inner end of said cylindrical bore, a conducting tongue slidably extending through said insulating bridge, a contact on the end of said tongue within said bored member for electrical engagement with the lamp stem contact an insulating grommet on said tongue contact, a strong coil spring between said insulating bridge and said insulating grommet urging said tongue outwardly of said bored cylindrical member, a conductor receiving terminal on the other end of said tongue without said internally bored member limiting the inward movement of said tongue, a closable door at the outer end of the bore member mounting wings on said receptacle; and an electrical grounding leaf spring mounted on said receptacle and extending through said slot and against said lamp stem.

4. A lamp member detachably insertable in a receptacle within the structural surface of an airplane to eliminate added air resistance, said lamp member including a lamp canopy in which a lamp is mounted and a lamp stem on which said lamp canopy is adjustably secured, said lamp stem including a hollow cylindrical member, a bayonet pin extending through at least one side thereof, an electrical contact insulatedly mounted at one end thereof, an internally and externally threaded neck at the other end thereof, an apertured ball member adapted to be secured to the internal threads of said neck, a knurled manually manipulable apertured socket member on the external threads of said neck, said canopy having a slotted bulge within which said ball member is placed to cooperate with said socket member in adjustably securing said canopy on said stem, and an electrical conduit secured to said stem contact and extended through said hollow stem, said neck, said ball and socket members to the lamp within said lamp canopy.

5. A quick attachable detachable airplane lightweight landing light comprising an electrical receptacle unit substantially within the structural surface of the airplane to eliminate added air resistance, and a combined lamp member and electrical plug member unit adapted to automatically electrically engage upon mechanical interconnection, said lamp member including a lamp canopy which is adjustably secured to the electrical plug member, said plug member including a hollow cylindrical member, a bayonet pin extending through at least one side thereof, an electrical contact insulatably mounted at one end thereof and an internally and externally threaded neck projecting at the other end thereof, an apertured ball member adapted to be secured to the internal threads of said neck, a knurled manually manipulable apertured socket member on the external threads of said neck, said canopy having a slotted bulge within which said ball member is placed to cooperate with said socket member in adjustably securing said canopy on said stem.

6. A quick attachable detachable airplane lightweight landing light comprising an electrical receptacle unit substantially within the structural surface of the airplane to eliminate added air resistance, and a combined lamp member and electrical plug member unit adapted to automatically electrically engage upon mechanical interconnection, said lamp member including a lamp canopy which is adjustably secured to the electrical plug member, said plug member including a hollow cylindrical member, a bayonet pin extending through at least one side thereof, an electrical contact insulatably mounted at one end thereof, and an internally and externally threaded neck projecting at the other end thereof, an apertured ball member adapted to be secured to the internal threads of said neck, a knurled manually manipulable apertured socket member on the external threads of said neck, said canopy having a slotted bulge within which said ball member is placed to cooperate with said socket member in adjustably securing said canopy on said stem, an electrical conduit secured to said stem contact and extending through said hollow stem, said hollow neck, said operating ball and socket members to the lamp within said lamp canopy.

WARREN G. GRIMES.

REFERENCES CITED

The following references are of record in the file of this patent:

UNITED STATES PATENTS

| Number | Name | Date |
| --- | --- | --- |
| 2,069,239 | Fraser | Feb. 2, 1937 |
| 2,076,020 | Fraser | Apr. 6, 1937 |
| 1,463,677 | Davis | July 31, 1923 |
| 1,590,376 | Hyatt | June 29, 1926 |
| 1,595,047 | Monson | Aug. 3, 1926 |
| 1,392,176 | Koenig | Sept. 27, 1921 |
| 1,184,966 | Knauff | May 30, 1916 |
| 1,978,510 | Spence, Jr. | Oct. 30, 1934 |
| 2,219,770 | Falge et al. | Oct. 29, 1940 |
| 2,071,769 | Schlicker et al. | Feb. 23, 1937 |
| 1,568,666 | Godley | Jan. 5, 1926 |
| 1,785,211 | Scofield | Dec. 16, 1930 |
| 1,828,097 | Colvin | Oct. 20, 1931 |